US008454052B1

(12) United States Patent
Rose et al.

(10) Patent No.: US 8,454,052 B1
(45) Date of Patent: Jun. 4, 2013

(54) AIR BAG INFLATION IN HIGH TEMPERATURE CONDITIONS

(75) Inventors: Larry D. Rose, South Weber, UT (US); Robert E. Lewis, West Haven, UT (US); Kirk Rasmussen, West Point, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/352,031

(22) Filed: Jan. 17, 2012

(51) Int. Cl.
*B60R 21/26* (2006.01)

(52) U.S. Cl.
USPC .......................................................... 280/736

(58) Field of Classification Search
USPC .................................. 280/736, 738, 739, 740
See application file for complete search history.

(56) References Cited

U.S. PATENT DOCUMENTS

| 5,683,102 | A | | 11/1997 | Davis et al. | |
|---|---|---|---|---|---|
| 5,788,274 | A | | 8/1998 | Gunn | |
| 6,039,346 | A | * | 3/2000 | Ryan et al. | 280/736 |
| 6,279,947 | B1 | * | 8/2001 | Faigle | 280/735 |
| 6,692,021 | B2 | | 2/2004 | Amamori | |
| 2006/0103124 | A1 | * | 5/2006 | Marotzke | 280/740 |
| 2006/0261583 | A1 | * | 11/2006 | Debler et al. | 280/740 |

FOREIGN PATENT DOCUMENTS

EP 518492 A1 * 12/1992

* cited by examiner

*Primary Examiner* — Faye M. Fleming
(74) *Attorney, Agent, or Firm* — Madson IP, P.C.

(57) ABSTRACT

A closure structure for the relief aperture of an airbag cushion inflator includes a closure core having outer and inner surfaces that is disposable into the relief aperture from the exterior of the inflator to fill the relief aperture. A sealing flange continuously secured to the periphery of the outer surface of the closure core abuts the outer surface of the inflator. A temperature-sensitive venting window formed in the closure core precludes the passage of pressurized inflation gas during a predetermined first ambient temperature condition and opens to emit pressurized inflation gas during a second hotter ambient temperature condition. The venting window includes a venting passageway extending between the inner and the outer surfaces the closure core sealingly traversed by a relatively thin venting membrane made of a temperature-sensitive material exhibiting less structural robustness at the second ambient temperature condition than at the first ambient temperature condition.

22 Claims, 9 Drawing Sheets

Figure 1

Figure 2
Typical inflator pressure performances with a
sixty-liter test tank at varied ambient temperatures Figure 3A
Inflation at a first ambient temperature condition $T_1$ Figure 3B
Inflation at a second ambient temperature condition $T_2$

AIR BAG INFLATION IN HIGH TEMPERATURE CONDITIONS

BACKGROUND OF THE INVENTION

1. Field of the Invention

The present invention pertains to maintaining the safety of riders in highway vehicles. More particularly, the present invention pertains to the inflation of passenger vehicle safety airbags to protect a rider from impact with the interior of the occupant enclosure of a vehicle under high temperature ambient conditions.

2. Background

Inflatable safety restraint devices, or airbags, are mandated in most new highway vehicles. Airbags are typically included at least in the steering wheel and in the dashboard on the passenger side of a highway vehicle. In addition, such airbags are occasionally installed to inflate beside a vehicle occupant and provide side impact protection, to inflate in front of the legs and protect the knees from forward impact, or to inflate at other strategic locations within the occupant enclosure of a highway vehicle.

In the event of an accident, a collision sensor within the vehicle detects an impact situation and stimulates an inflator to produce pressurize gas. That pressurized gas is directed into an associated airbag, filling the cushion of the airbag, which then prevents any vehicle rider from impacting directly the interior surfaces of the occupant enclosure. The generation of compressed gas by the inflator is commenced through the electrical activation of a small pyrotechnic initiator within the inflator. Inflatable airbags with associated inflators and initiators are usually manufactured together as vehicle passenger safety airbag modules, which are installed as a unit at appropriate locations in vehicles.

A passenger-side, frontal-impact vehicle passenger safety airbag module is commonly installed behind the dashboard of a vehicle at an airbag deployment window formed therethrough. The initiator in the inflator of the module is placed in electrical communication with the collision sensor of the vehicle.

The ambient temperature conditions under which the cushion of such an airbag module is required to be inflated varies widely according to the geographic location of the vehicle in which the corresponding airbag module is installed, as well as the season, the weather conditions, and the time of day during which inflation occurs.

BRIEF SUMMARY OF THE INVENTION

According to teachings of the present invention, a closure structure for a relief aperture in the wall of an inflator of a passenger vehicle safety airbag module includes a closure core that is capable of being disposed into the relief aperture from the exterior of the inflator. Upon disposition in the relief aperture in this manner, the closure core substantially fills the relief aperture and extends therethrough between an outer surface of the closure core that is oriented toward the exterior of the inflator and an inner surface of the closure core that is oriented toward the interior of the inflator. A sealing flange is continuously secured to the periphery of the outer surface of the closure core. Thus, the sealing flange abuts the outer surface of the wall of the inflator upon disposition of the closure core in the relief aperture. A temperature-sensitive venting window is formed in the closure core. The venting window precludes the passage of pressurized inflation gas through the closure core during a predetermined first ambient temperature condition, but the venting window opens to emit pressurized inflation gas through the closure core during a predetermined second ambient temperature condition that is hotter than the first ambient temperature condition.

A venting window according to teachings of the present invention includes a venting passageway that is formed through the closure core between the inner surface and the outer surface thereof in combination with a relatively thin venting membrane that sealingly traverses the venting passageway. The venting membrane precludes the passage of pressurized inflation gas through the venting passageway during the first ambient temperature condition, but the venting membrane ruptures to emit pressurized inflation gas through the venting passageway during the second ambient temperature condition. The venting membrane is made of a temperature-sensitive material that exhibits less structural robustness at the second ambient temperature condition than at the first ambient temperature condition. The temperature-sensitive material may be selected from a group of temperature-sensitive materials that includes nylon, acrylonitrile-butadiene-styrene, and polypropylene. In one exemplary embodiment of a venting window according to teachings of the present invention, the venting membrane traverses the venting passageway intermediate the inner surface and the outer surface of the closure core.

In another exemplary embodiment of a closure structure as described above, the closure structure also includes a temperature-sensitive supplemental venting window that is formed in the closure core of the closure structure. The supplemental venting window includes a supplemental venting passageway that is formed through the closure core between the inner surface and the outer surface thereof in combination with a relatively thin supplemental venting membrane that sealingly traversing the supplemental venting passageway. The supplemental venting membrane precludes the passage of pressurized inflation gas through the venting passageway during the first ambient temperature condition as well as during the second ambient temperature condition, but the supplemental venting membrane ruptures to emit pressurized inflation gas through the venting passageway during a predetermined third ambient temperature condition that is hotter even that the second ambient temperature condition. In many, but not necessarily all circumstances, for this to occur, the thickness of the supplemental venting membrane will be greater than the thickness of the venting membrane.

Advantageously, an installation verification post may be made to project from the outer surface of the closure core interior of the sealing flange. The installation verification post will give ready notice upon a visual or a tactile examination of an inflator whether a closure structure embodying teachings of the present invention has been inserted into the relief aperture in the wall of that inflator. For simplicity in the manufacture of a closure structure of the type described above, the closure core, the sealing flange, the venting window, and the installation verification post may be integrally formed from a temperature-sensitive material that exhibits less structural robustness at the second ambient temperature than at the first ambient temperature condition. Such a closure structure may to further advantage also include a retention snap that extends radially outwardly from the periphery of the inner surface of the closure core in such a manner that the retention snap engages the inner surface of the wall of the inflator upon disposition of the closure core in the relief aperture thereof.

The present invention also contemplates an entire passenger safety airbag module incorporating teachings of the present invention. Typically, such a passenger vehicle safety airbag module will have both a housing that is capable of being secured within a passenger vehicle, and an inflatable cushion that is secured in a deflated condition within that housing. The airbag module then also includes an inflator disposed in the housing in fluid communication with the interior of the cushion. The inflator is being capable of supplying pressurized inflation gas to the cushion through an inflation aperture that is formed through the wall of inflator, and the inflator has a relief aperture that is formed through the wall of the inflator on a side thereof that is opposite from the inflation aperture. The closure structure includes a closure core that substantially fills the relief aperture and extends therethrough from an outer surface of the closure core that is oriented toward the exterior of the inflator to an inner surface of the closure core that is oriented toward the interior of the inflator. A sealing flange is continuously secured to the periphery of the outer surface of the closure core abutting the outer surface of the wall of the inflator. A temperature-sensitive venting window is formed in the closure core. The venting window precludes the passage of pressurized inflation gas through the closure core during a predetermined first ambient temperature condition, but the venting window opens to emit pressurized inflation gas through the closure core during a predetermined second ambient temperature condition that is hotter than the first ambient temperature condition. A clamp secures the inflator against the interior of the housing with the sealing flange of the closure structure compressed therebetween.

In a passenger safety airbag module as described above, an exhaust window may advantageously be formed through the housing of the airbag module. Then, the inflator of the airbag module is so positioned in the housing that the relief aperture of the inflator is directed toward the exhaust window in the housing of the airbag module. The inflator may be disposed within the cushion and secured in the housing of the airbag module that the inflator secures the cushion to that housing.

According to further teachings of the present invention, methods are provided for inflating the cushion of a passenger vehicle safety airbag module in elevated ambient temperature conditions. A typical airbag module will include an inflator for the cushion that is disposed within a rigid housing in fluid communication with the interior of the cushion. The inflator is capable of supplying pressurized inflation gas to the cushion through an inflation aperture that is formed through the wall of the inflator. One exemplary embodiment of such a method incorporating teachings of the present invention includes the steps of forming a relief aperture in the wall of the inflator on a side thereof generally opposite from the inflation aperture, filling the relief aperture with a closure core inserted into the relief aperture from the exterior of the inflator, and fashioning a temperature-sensitive venting window in the closure core that precludes the passage of pressurized inflation gas through the closure core during a predetermined first ambient temperature condition, but that opens to emit pressurized inflation gas through the closure core during a predetermined second ambient temperature condition that is hotter than the first ambient temperature condition.

The step of fashioning a temperature-sensitive venting window in the closure core includes the step of excavating a venting passageway through the closure core between an outer surface of the closure core that is oriented toward the exterior of the inflator and an inner surface of the closure core that is oriented toward the interior of the inflator, in combination with the step of closing the venting passageway with a relatively thin venting membrane that is made of a temperature-sensitive material that is capable of precluding the passage of pressurized inflation gas through the venting passageway during the first ambient temperature condition, but that ruptures to emit pressurized inflation gas through the venting passageway during the second ambient temperature condition. The temperature-sensitive material of the venting membrane should exhibit less structural robustness at the second ambient temperature condition than at the first ambient temperature condition.

Advantageously, a method as described above optionally includes all or some of the steps of opening an exhaust window through the housing of the airbag module, securing the inflator within the housing with the relief aperture in the wall of the inflator directed toward the exhaust window, circumscribing the closure core on the exterior of the inflator with a continuous sealing flange, urging the sealing flange against the outer surface of the wall of the inflator, and attaching to the closure core an installation verification post that projects outwardly of the inflator when the relief aperture is filled by the closure core.

BRIEF DESCRIPTION OF THE SEVERAL VIEWS OF THE DRAWINGS

In order that the manner in which the above-recited and other features and advantages of the present invention are obtained will be readily understood, a more particular description of the present invention briefly described above will be rendered by reference to specific embodiments thereof which are illustrated in the appended drawings. Understanding that these drawings depict only typical embodiments of the present invention and are not therefore to be considered to be limiting of scope thereof, the present invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of embodiments of the present invention, as represented in FIGS. 1-10, is not intended to limit the scope of the invention, as claimed, but is merely representative of presently preferred embodiments of the invention.

In this application, the phrases "connected to", "coupled to", and "in communication with" refer to any form of interaction between two or more entities, including mechanical, electrical, magnetic, electromagnetic, pneumatic, and thermal interactions.

The phrases "attached to", "secured to", and "mounted to" refer to a form of mechanical coupling that restricts relative translation or rotation between the attached, secured, or mounted object, respectively. The phrases "pivotally attached to" and "slidably attached to" refer to forms of mechanical coupling that permit relative rotation or relative translation, respectively, while restricting other relative motions. The phrase "attached directly to" refers to a form of securement in which the secured items are in direct contact and retained in that state of securement.

The term "abutting" refers to items that are in direct physical contact with each other, although the items may not be attached together. The term "grip" refers to items that are in direct physical contact with one of the items firmly holding the other. The term "integrally formed" refers to a body that is manufactured as a single piece, without requiring the assembly of constituent elements. Multiple elements may be integrally formed with each other, when developed attached directly to each other from a single work piece. Thus, elements that are "coupled to" each other may be formed together as a single piece.

Figure 1:
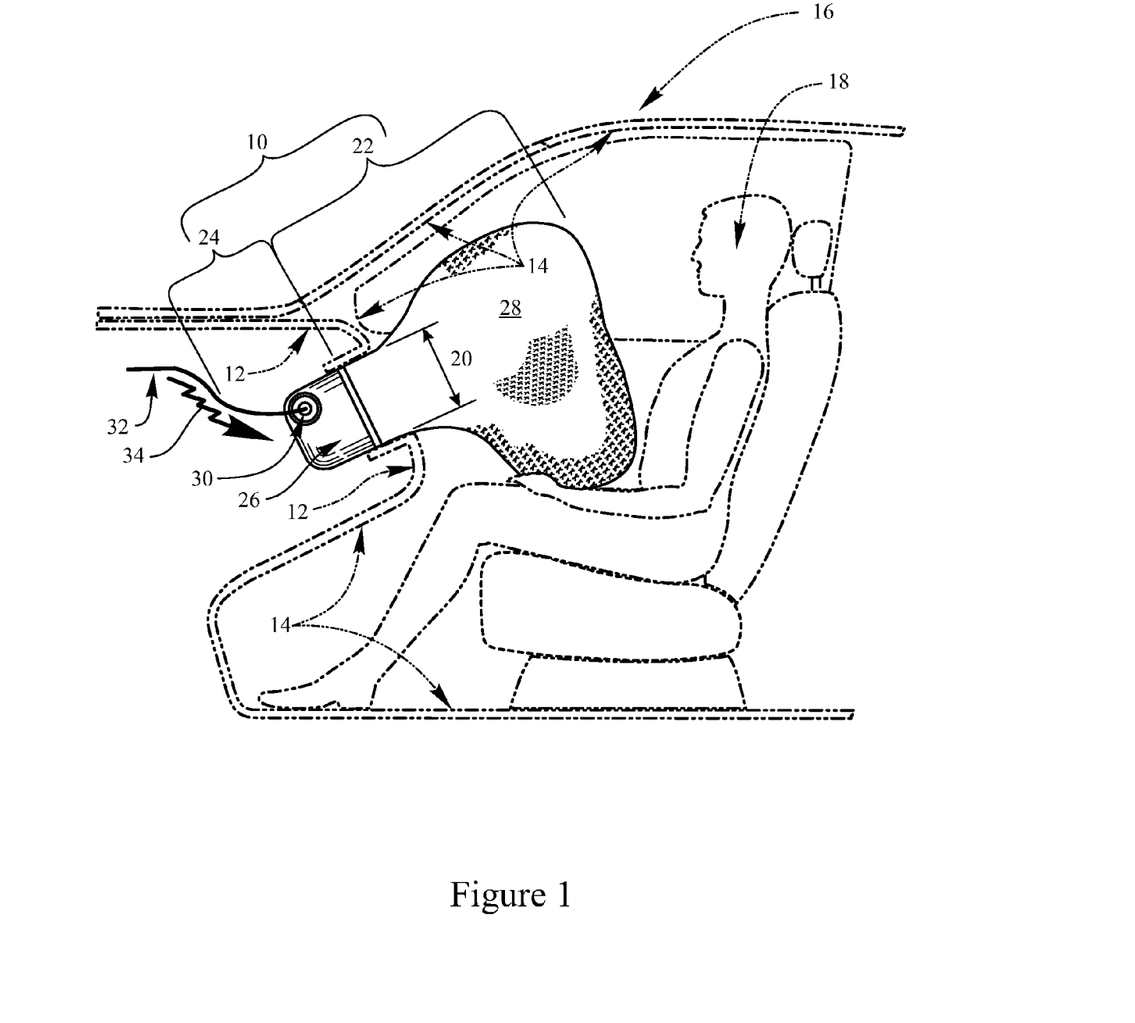
FIG. 1 is a side elevation view of a vehicle passenger safety airbag module incorporating teachings of the present invention mounted as a passenger-side, frontal-impact protection feature on the instrument panel of a highway vehicle and deployed into the occupant enclosure with the cushion of the airbag in an inflated condition.

FIG. 1 is a side elevation view of an embodiment of a vehicle passenger safety airbag module 10 incorporating teachings of the present invention and mounted as a passenger-side, frontal-impact protection feature at the dashboard 12 of the occupant enclosure 14 of a highway vehicle 16 (shown in phantom lines). Airbag module 10 provides protection to a rider 18 seated within occupant enclosure 14 by precluding, for example, the head or legs of rider 18 from impacting the interior of occupant enclosure 14 during a collision involving vehicle 16.

It should be understood, however, that the teachings of the present invention have applicability, not only to passenger-side, frontal-impact protection, but also to other forms of passenger protection, such as knee bolsters, overhead airbags, inflatable curtains, side airbags, inflatable structural stiffeners, and the like. Consequently, although a passenger-side airbag is disclosed and described herein, the term "passenger vehicle safety airbag" includes these other forms of passenger protection. Furthermore, the teachings of the present invention may be employed advantageously, not only in highway vehicles, but also in vehicles that travel over rails, from cables, on water, and through air or space.

Airbag module 10 is installed in vehicle 16 at an airbag deployment window 20 formed through dashboard 12. As shown by way of example and not limitation, airbag module 10 in FIG. 1 is mounted outside of occupant enclosure 14 in proximity to deployment window 20. Alternatively, an airbag module, such as airbag module 10, may be installed in a mounting recess formed in a side of occupant enclosure 14 that faces rider 18. In such instances, the mouth of the mounting recess also faces rider 18 and functions as an airbag deployment window in the same manner as deployment window 20.

By way of overview, airbag module 10 includes a deployment portion 22 and an energizer portion 24 that is secured to dashboard 12 at deployment window 20. Energizer portion 24 is enclosed within a vehicle safety airbag module housing 26 that is supported securely from some structural element of vehicle 16 that does not appear in FIG. 1. Deployment portion 22 includes a gas-inflatable, impact-absorbing cushion 28.

Energizer portion 24 of airbag module 10 is manufactured in inflation communication with deployment portion 22. Energizer portion 24 generates and delivers pressurized gas to cushion 28 in deployment portion 22, when an impact is imminent between rider 18 and occupant enclosure 14. Toward that end, energizer portion 24 includes an inflator 30 that produces the pressurized gas for cushion 28 and that is secured within module housing 26. Inflator 30 may, for example, be a compressed gas inflator, a pyrotechnic inflator, a hybrid inflator, or any other type of device that generates pressurized gas with extreme dispatch.

The activation of inflator 30 is triggered electrically, but indirectly, by way of a pyrotechnic initiator that is not identified in FIG. 1. An electrical wire 32 is coupled between the initiator of inflator 30 and the collision sensor for vehicle 16. When an impact involving vehicle 16 is occurring, or is about to occur, the collision sensor generates an activation signal 34 that is transmitted along electrical wire 32 to trigger activity in inflator 30. Inflator 30 then produces an abundance of compressed gas that is communicated into deployment portion 22 of airbag module 10, filling cushion 28 to capacity and causing cushion 28 to extend through deployment window 20 into occupant enclosure 14 intermediate rider 18 and dashboard 12 and windshield as shown.

Figure 2:
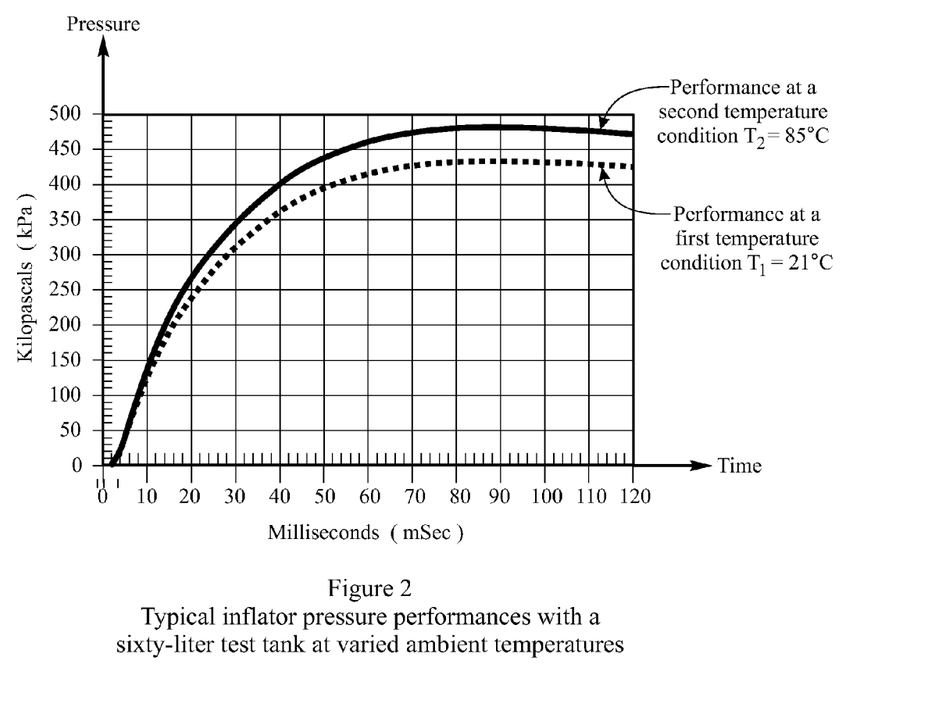
FIG. 2 is a graph depicting typical inflator pressure performances at varied ambient temperature conditions illustrating the problem addressed by the teachings of the present invention.

FIG. 2 is a graph depicting typical inflator pressure performances at differing ambient temperatures when directed into a sixty-liter test tank.

The horizontal scale reflects time as measured in milliseconds following the initiation of the generation of pressurized gas by the inflator being tested. The vertical scale in kilopascals represents the pressure developed in the test tank at various times after the commencement of the generation of pressurized gas by the inflator. The performance at a low, first ambient temperature condition $T_1=21°$ C. is shown by a dashed line, while the performance at a hotter elevated, second ambient temperature condition on $T_2=85°$ C. is shown with a solid line.

In both temperature conditions, during about the first fifteen milliseconds following the commencement of the generation of pressurized gas by the inflator, the pressure in the test tank rises rapidly in a substantially linear manner, reaching about 200 kilopascals. Then, the rate of the rise of the pressure in the test tank begins to slow, but the performance at elevated, second ambient temperature condition $T_2=85°$ C. departs upwardly in terms of pressure from that of the performance at the cooler low, first ambient temperature condition $T_1=21°$ C. In the latter case, at about 70 milliseconds following the initiation of the generation of pressurized gas by the inflator, the pressure in the test tank becomes relatively steady at about 425 kilopascals. On the other hand, at hotter, elevated, second ambient temperature condition $T_2=85°$ C., at about 70 milliseconds following the initiation of the generation of pressurized inflation gas, the pressure in the test tank stabilizes at a higher level of at about 475 kilopascals.

Thus, an inflator in a passenger vehicle safety airbag module can be expected to become about 8-15% more aggressive at elevated ambient temperature conditions. A correspondingly more energetic cushion deployment will result, and this in turn creates a number of problems.

First, an energetic deployment alters the passenger restraint performance in a deployed passenger vehicle safety airbag module by giving rise to the development of abnormally high pressures in the cushion of the airbag module. As a result, a cushion inflating at higher temperatures may impact the occupant of a vehicle at a higher velocity and with more force than occurs during deployment at lower ambient temperatures. Second, high onset aggressiveness in cushion inflation challenges the adequacy of the restraint of the associated airbag module within a passenger vehicle. All portions of the occupant enclosure of a passenger vehicle may not be designed with sufficient robustness to maintain structural integrity when the cushion of a passenger vehicle airbag inflates aggressively. Enhancing the structural robustness of occupant enclosure components increases weight and consumes space. Third, the aggressive deployment of the cushion of a passenger vehicle safety airbag also threatens the structural integrity of the airbag module itself. The airbag cushion may be susceptible to tearing, or hardware used to secure together components of an airbag module may prove insufficient to the task. This risks having the cushion of an airbag module fail, or having other components of the airbag module itself break loose and become dangerous projectiles during cushion deployment.

None of these consequences are salutary. Most efforts to accommodate for cushion deployment in high temperature ambient conditions result in increased costs in the manufacture of vehicles and of airbag modules.

These problems can, however, be avoided effectively and inexpensively according to teachings of the present invention. An overview of the manner in which this occurs will be explained by reference to FIGS. 3A and 3B taken together.

Figure 3A:
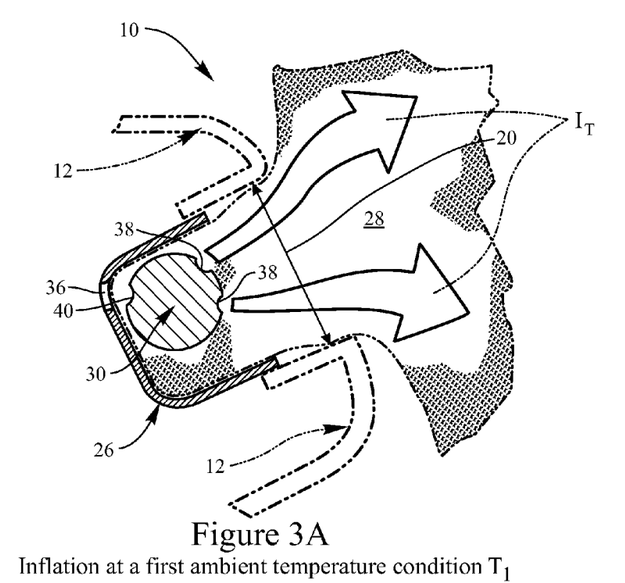
FIG. 3A is an enlarged, diagrammatic cross section of the inflator and adjacent structures of the vehicle passenger safety airbag module of FIG. 1 during inflation of the cushion of the airbag module under a low, first ambient temperature condition $T_1$.

FIG. 3A is a diagrammatic cross section of inflator 30 and adjacent structures of airbag module 10, such as module housing 26 and cushion 28 (shown in partial cutaway), during the inflation of cushion 28 at a low, first ambient temperature condition $T_1$. Inflator 30 can be seen to be disposed within cushion 28 and within module housing 26 in the vicinity of an exhaust window 36 that is formed through module housing 26. The function of exhaust window 36 will be discussed subsequently in relation to FIG. 3B. Inflator 30 is in fluid communication with the interior of cushion 28 through one or more inflation apertures 38 formed through the wall of inflator 30. Inflator 30 is thus capable of supplying pressurized inflation gas to cushion 28. During the inflation of cushion 28 under low, first ambient temperature condition $T_1$, all of the pressurized inflation gas generated in inflator 30 leaves inflator 30 through inflation apertures 38 as total inflation gas $I_T$, causing the deployment of cushion 28.

The wall of inflator 30 also includes a relief aperture 40 formed therethrough on the side of inflator 30 opposite from inflation apertures 38. Relief aperture 40 does not, however, function during the inflation of cushion 28 under low, first ambient temperature condition $T_1$. This is due to the disposition in relief aperture 40 of a closure structure that incorporates teachings of the present invention and that is depicted and described in detail subsequently.

Figure 3B:
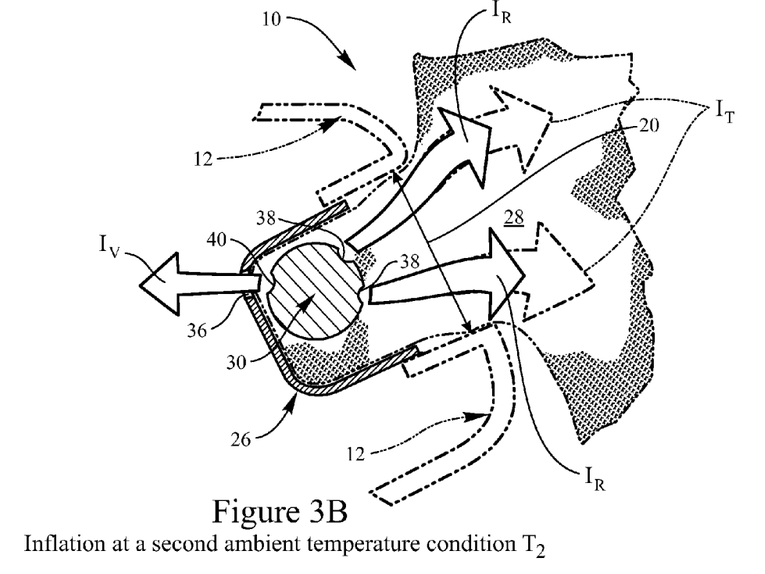
FIG. 3B is a cross section like that of FIG. 3A showing the inflator and adjacent structures of the vehicle passenger safety airbag module of FIG. 1 during inflation of the cushion of the airbag module in an elevated, second ambient temperature condition $T_2$.

FIG. 3B depicts inflator 30 and module housing 26 during the inflation of cushion 28 of airbag module 10 an elevated, second ambient temperature condition $T_2$. Then, the closure structure in relief aperture 40 permits a portion of the pressurized inflation gas generated in inflator 30 to be diverted from cushion 28 as vented inflation gas $I_V$. Vented inflation gas $I_V$ passes through the closure structure relief in aperture 40 and then through exhaust window 36 in module housing 26. Consequently, only a diminished residual inflation gas $I_R$ is emitted from inflator 30 into cushion 28 through inflation apertures 38. The volume of residual inflation gas $I_R$ is reduced by about 5-15% relative to the volume of total inflation gas $I_T$ illustrated in FIG. 3A as being emitted into cushion 28 under low, first ambient temperature condition $T_1$. By way of comparison, total inflation gas $I_T$ is depicted in phantom in FIG. 3B.

An understanding of the inventive closure structure employed in relief aperture 40 necessitates a discussion of some construction details pertaining to airbag module 10. In so doing, the manner in which the components of airbag module 10 interact in the vicinity of relief aperture 40 and exhaust window 36 will also be investigated in greater detail.

Figure 4:
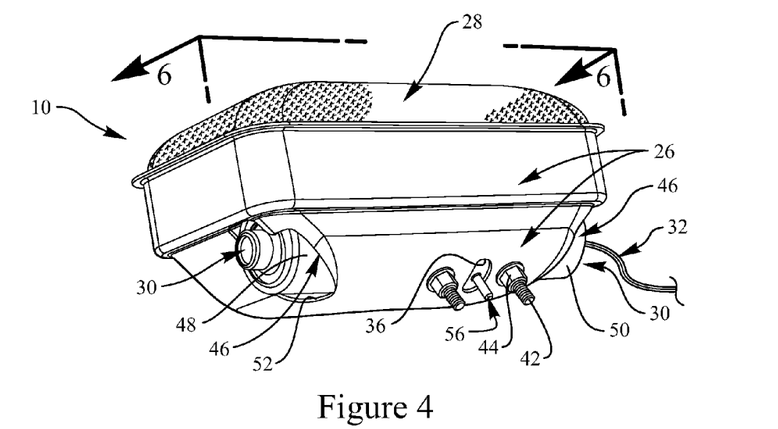
FIG. 4 is a perspective view of the vehicle passenger safety airbag module of FIG. 1 in a manufactured condition in advance of becoming installed in a vehicle in the manner illustrated in FIG. 1.

FIG. 4 is a perspective view of airbag module 10 from FIG. 1 prior to being installed in a vehicle. Cushion 28 and inflator 30 are secured within housing module 26 by cooperating pairs of bolts 42 and nuts 44. The heads of bolts 42 are not visible in FIG. 4, but these are retained within inflator 30. The shafts of bolt 42 project outwardly from inflator 30 and pass through cushion 28 and module housing 26 before nuts 44 are threaded onto the free ends thereof. Inflator 30 includes a cylindrical outer wall 46 having a first end 48 and a second end 50. First end 48 of wall 46 of inflator 30 is shown on the left side of FIG. 4 extending out of module housing 26 through an inflator insertion opening 52 formed through module housing 26. Second end 50 of wall 46 of inflator 30 extends out of module housing 26 on the right side of FIG. 4 through a similar inflator insertion opening that is not visible in that figure. Thus, a medial portion of wall 46 of inflator 30 is disposed traversing exhaust window 36 in module housing 26. Projecting through exhaust window 36 in module housing 26 is an installation verification post 56 that is attached to the inventive closure structure mentioned earlier. Installation verification post 56 gives advice from the exterior of airbag module 10 that the inventive closure structure is in place. Electrical wire 32 is coupled to inflator 30 at second end 50 of wall 46 thereof.

Figure 5:
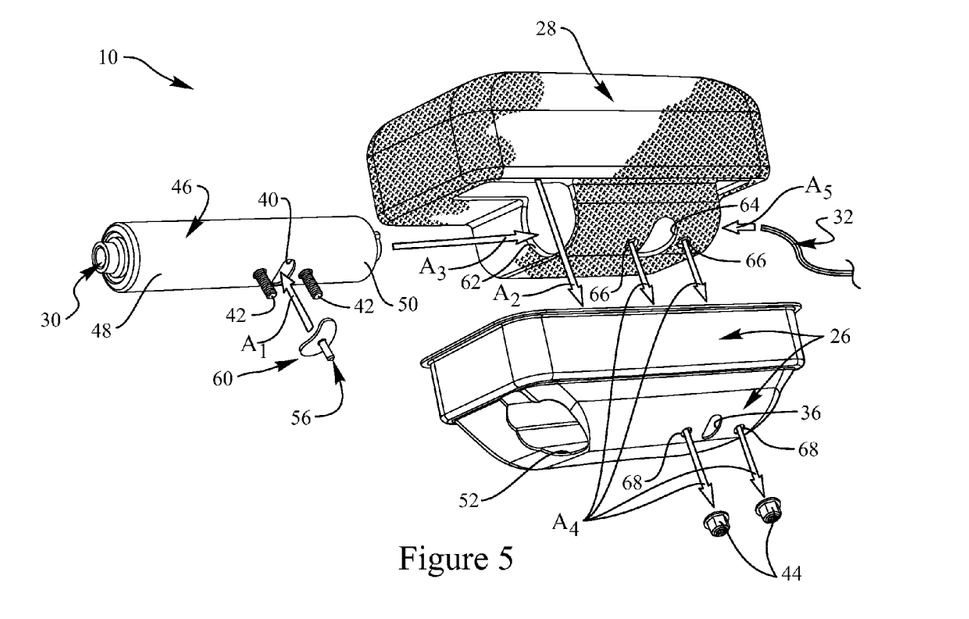
FIG. 5 is an exploded perspective view of elements of the vehicle passenger safety airbag module of FIG. 4.

The components of airbag module 10 are shown in exploded perspective in FIG. 5. There, a temperature-sensitive closure structure 60 incorporating teachings of the present invention can be seen free of relief aperture 40 in wall 46 of inflator 30. Closure structure 60 carries installation verification post 56. Inflator 30 and cushion 28 are shown apart from module housing 26. For this to have occurred, each of nuts 44 is shown to have been threaded off the shaft of a respective of bolts 42. Electrical wire 32 is shown uncoupled from inflator 30.

To assemble the elements depicted in FIG. 5 into the manufactured state of airbag module 10 shown in FIG. 4, closure 60 is first inserted into relief aperture 40 in wall 46 from the exterior of inflator 30 as suggested by assembly arrow $A_1$. Then as suggested by assembly arrow $A_2$, cushion 28 is lowered into module housing 26 so that an assembly opening 62 formed through cushion 28 on the left side of FIG. 5 is aligned with inflator insertion opening 52 visible in that figure. A similar assembly opening in the opposite side of cushion 28 becomes coincident in the process with an inflator insertion opening in the opposite side module housing 26. Neither is visible in FIG. 5.

A centrally disposed medial assembly opening 64 is formed through cushion 28. Medial assembly opening 64 comes to be opposite exhaust window 36 in module housing 26, when cushion 28 is placed therein. To either side of medial assembly opening 64, bolt-receiving eyes 66 are formed through cushion 28. When cushion 28 is assembled in module housing 26, bolt-receiving eyes 66 align with bolt passage eyes 68 that are formed through module housing 26 on either side of exhaust window 36.

As indicated by assembly arrow $A_3$, inflator 30 with closure structure 60 installed in relief aperture 40 is entered into module housing 26 and into cushion 28 through inflator insertion opening 52 in module 26 and through assembly opening 62 in cushion 28. Once inflator 30 is inside of module housing 26 and cushion 28, then as suggested by assembly arrows $A_4$, bolts 42 are aligned with and advanced through both bolt-receiving eyes 66 in cushion 28 and bolt passage eyes 68 in module housing 26. Nuts 44 are threaded onto bolts 42, securing inflator 30 through cushion 28 in module housing 26. Electrical wire 32 is most commonly coupled to inflator 30 after airbag module 10 has been installed in a vehicle, which is suggested in FIG. 5 by assembly arrow $A_5$.

Figure 6:
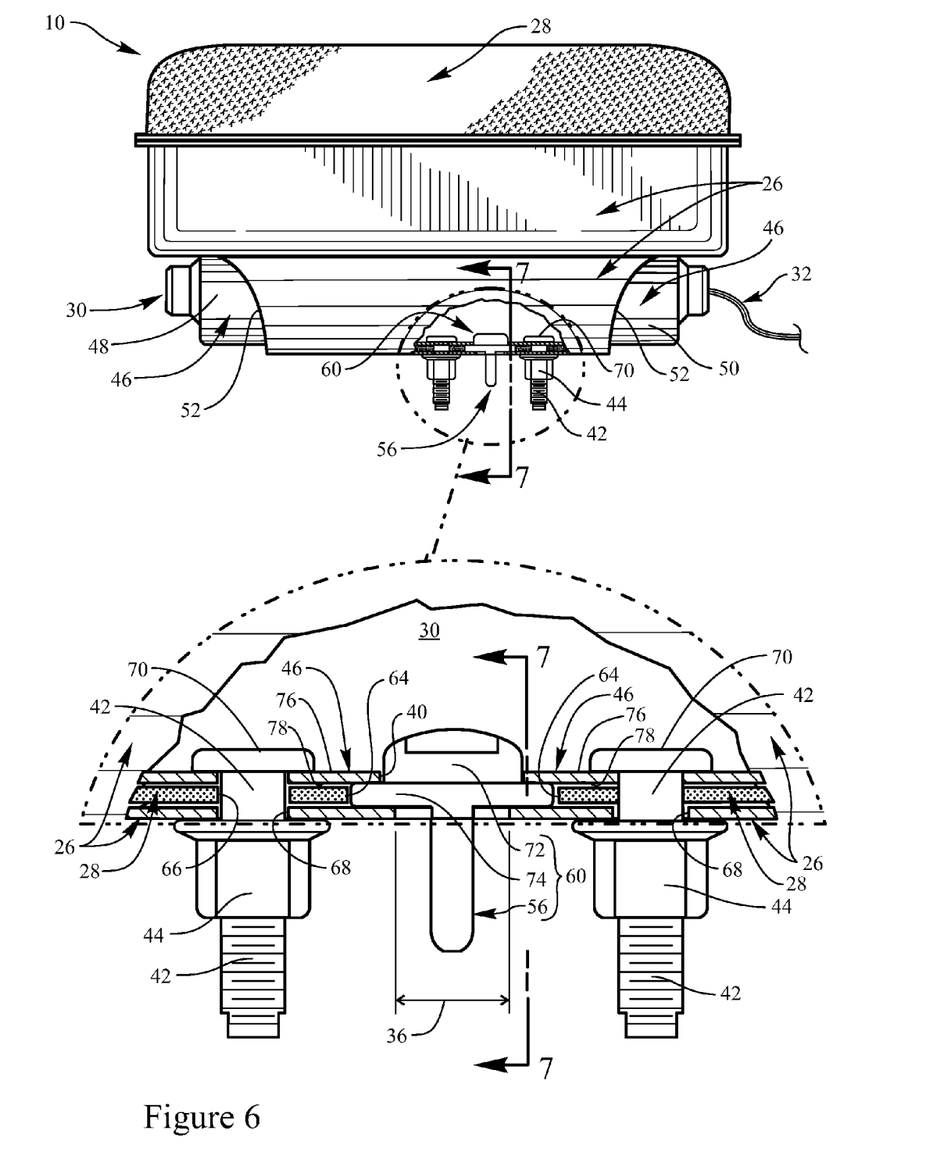
FIG. 6 is an elevation view in partial cutaway, cross section of the vehicle passenger safety airbag module of FIG. 4 taken along section line 6-6 therein and showing in the enlarged inset associated therewith structural elements incorporating teachings of the present invention to produce the airbag module performances depicted in FIGS. 3A and 3B.

FIG. 6 is an elevational view of the assembled airbag module 10 from FIG. 4 in which the portion of airbag module 10 between and in the vicinity of bolts 42 is shown in a cutaway cross section. An enlargement of the cross-sectional portion of FIG. 6 is shown in the inset included therein.

There the heads 70 of each of bolts 42 can be seen to be retained inside of inflator 30, bearing against an inner surface 76 of wall 46 of inflator 30. Wall 46 of inflator 30 also includes an outer surface 78 that faces toward module housing 26. Captured between module housing 26 and outer surface 78 of wall 46 of inflator 30 is the portion of cushion 28 intermediate and adjacent to bolt-receiving eyes 66. Cushion 28 is retained in airbag module 10, regardless of whether module housing 26 together with outer surface 78 of wall 46 apply any pinching forces to the portion of cushion 28 between bolt-receiving eyes 66.

The tightening of nuts 44 onto the shafts of each respective bolt 42 does, however, draw heads 70 of bolts 42, and correspondingly wall 46 of inflator 30, into close proximity to module housing 26. In this manner, and as will be explained fully below, nuts 44 and bolts 42 function together as clamps that securely retain closure structure 60 in relief aperture 40 and between module housing 26 and outer surface 78 of wall 46 of inflator 30.

Closure structure 60 includes a closure core 72 that substantially fills relief aperture 40 in wall 46 of inflator 30. A sealing flange 74 is continuously secured to the periphery of closure core 72 on the side thereof disposed on the exterior of inflator 30. Sealing flange 74 of closure structure is thus positioned between wall 46 of inflator 30 and module housing 26, where sealing flange 74 is clamped in compression between the interior of module housing 26 and outer surface 78 of wall 46 of inflator 30 by the action of nuts 44 and bolts 42. Sealing flange 74 is thus urged against outer surface 78 of wall 46 of inflator 30. When closure 60 is inserted into relief aperture 40, and inflator 30 is assembled within module housing 26 as shown in FIG. 6, sealing flange 74 is placed in compression continuously abutting outer surface 78 of wall 46 of inflator 30, sealing relief aperture 40 against the escape of pressurized inflation gas generated in inflator 30. The compression of sealing flange 74 in this manner is important, as pressures inside an inflator, such as inflator 30, during the generation of inflation gas can, at even low temperatures, rise to about 10.3 megapascals, or about 1,500 pounds per square inch.

Projecting from closure core 72 interior of sealing flange 74 is installation verification post 56. Installation verification post 56 thus extends through exhaust window 36 in module housing 26 and is advantageously detectable visually and tactilely from the exterior of airbag module 10.

Figure 7:
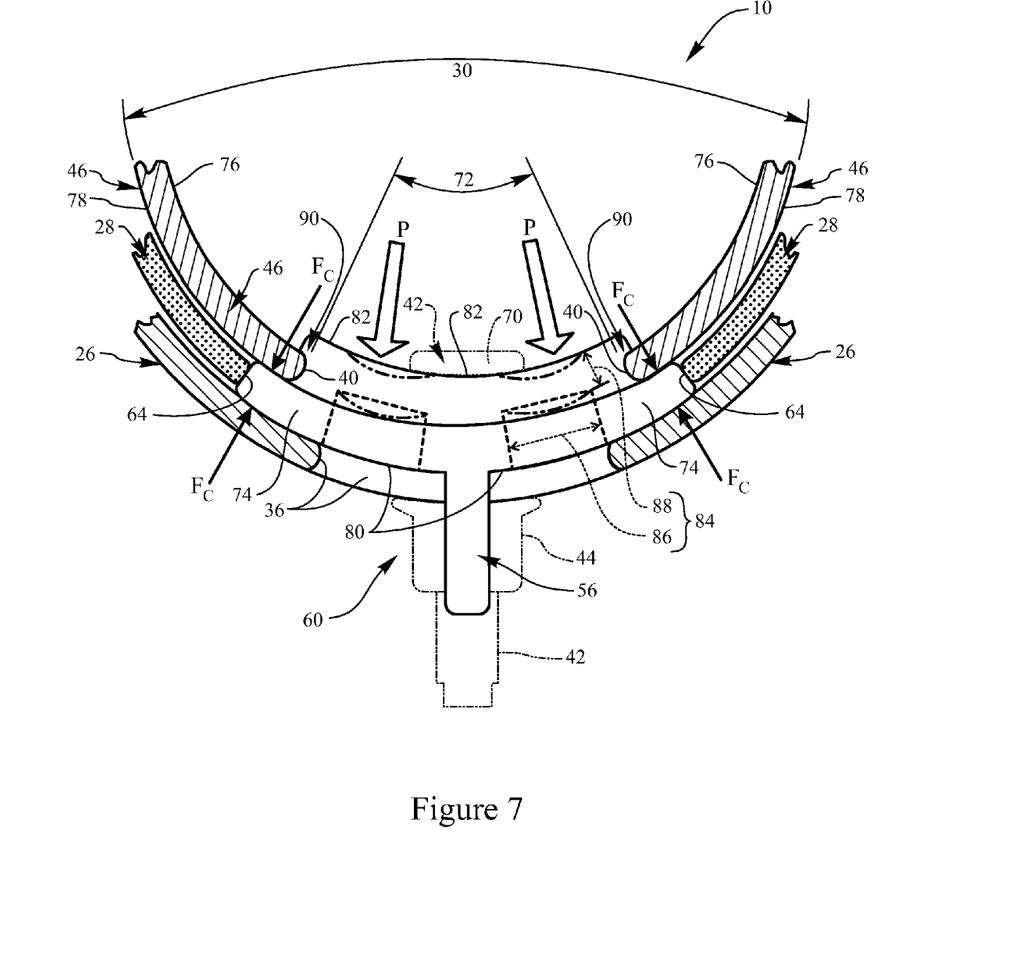
FIG. 7 is an elevation view in partial cross section of FIG. 6 taken along section line 7-7 therein diagrammatically depicting the effect of inflation gas produced in the inflator of FIG. 1 on a first embodiment of a temperature-sensitive closure structure incorporating teachings of the present invention and installed in a relief aperture in the wall of the inflator.

Additional features of closure structure 60 are revealed in FIG. 7. As seen therein, temperature-sensitive closure structure 60 for a relief aperture, such as relief aperture 40 in wall 46 of inflator 30, includes closure core 72, which is capable of being disposed in relief aperture 40 from the exterior of inflator 30. Closure core 72 fills release aperture 40 and extends between an outer surface 80 of closure core 72 that is oriented toward the exterior of inflator 30 and an inner surface 82 of closure core 72 that is oriented toward the interior of inflator 30. Sealing flange 74 is continuously secured about the periphery of outer surface 80 of closure core 72. Thus, sealing flange 74 of closure structure 60 abuts outer surface 78 of wall 46 of inflator 30, when closure core 72 is disposed in relief aperture 40. Sealing flange 74 is compressed between wall 46 of inflator 30 and module housing 26 by a compressive force $F_c$ that is represented in FIG. 7 by oppositely directed arrows on opposite sides of sealing flange 74. Compressive force $F_c$ arises indirectly due to the clamping action of nuts 44 and bolts 42. By way of perspective, a paired nut 44 and bolt 42 are shown in phantom in FIG. 7 on the far side of closure structure 60.

Dashed lines in FIG. 7 depict a temperature sensitive venting window 84 that is formed in closure core 72. Venting window 84 precludes the passage of any pressurized inflation gas through closure core 72 during low, first ambient temperature condition $T_1$. On the other hand, venting window 84 opens to emit pressurized inflation gas through closure core 72 during elevated, second ambient temperature condition $T_2$, which is hotter than low, first ambient temperature condition $T_1$.

To accomplish these functions, venting window 84 includes a venting passageway 86 that is formed through closure core 72 between inner surface 82 and outer surface 80 thereof. Venting window 84 is, however, traversed by a relatively thin venting membrane 88. Venting membrane 88 precludes the passage of pressurized inflation gas through venting passageway 86 during low, first ambient temperature condition $T_1$, but venting membrane 88 ruptures to emit pressurized inflation gas through venting passageway 86 during elevated, second ambient temperature condition $T_2$. Pressurized inflation gas emitted through venting passageway 86 during elevated, second ambient temperature condition $T_2$ is depicted and identified in FIG. 3B as vented inflation gas $I_V$.

Venting membrane 88 is constructed from a temperature-sensitive material that exhibits less structural robustness at elevated, second ambient temperature condition $T_2$ than at cooler low, first ambient temperature condition $T_1$. Thus, venting membrane 88 may be constructed, for example, from a material selected from the group of temperature-sensitive materials that includes nylon, acrylonitrile-structures, and polypropylene. For example, at a low, first ambient temperature condition $T_1=21°$ C., a venting membrane made of forty percent glass-filled nylon will maintain its structural integrity in the face of a pressure in an inflator, such as inflator 30, of about 131 megapascals, or about 19,000 pounds per square inch. On the other hand at an elevated, second ambient temperature condition $T_2=85°$ C., such a venting membrane will fail when presented with a pressure of only about 75 megapascals, or only about 11,000 pounds per square inch.

In one embodiment of a closure structure, such as closure structure 60, the closure core 72 thereof, the sealing flange 74 thereof, the venting window 84 thereof, and the installation verification post 56 thereof are integrally formed from such a temperature-sensitive material that exhibits less structural robustness at elevated, second ambient temperature condition $T_2$ than at low, first ambient temperature condition $T_1$.

FIG. 7 includes arrows that diagrammatically suggest the undesirable, excessive pressure P developed in inflator 30, when inflator 30 generates pressurized inflation gas at a high temperature, such as at elevated, second ambient temperature condition $T_2$. The material composition of venting membrane 88, and the thickness and extent thereof are so selected as to maintain the structural integrity of venting membrane 88 during the generation of pressurized inflation gas in inflator 30 at low, first ambient temperature condition $T_1$. Excessive pressure P of the inflation gas generated at an elevated temperature, such as at elevated, second ambient temperature condition $T_2$, depresses venting membrane 88 outwardly of inflator 30 as shown in phantom in FIG. 7. Excessive pressure P produces sufficient strain in the material of venting membrane 88 as to overcome the structural integrity thereof. Then venting membrane 88 ruptures. This permits vented inflation gas $I_V$ to escape from inflator 30 without entering cushion 28 by passing through venting window 84 in closure core 72. An identical, but optional, second venting window 84 is shown in closure structure 60 in FIG. 7 on the opposite side of installation verification post 56.

Closure structure 60 includes a pair of securement snaps 90 that projects from respective opposite ends of inner surface 82 of closure core 72. Each retention snap 90 engages inner surface 76 of wall 46 of inflator 30 adjacent to relief aperture 40, when closure core 72 is inserted into relief aperture 40. In this manner retention snaps 90 maintain the position of closure structure 60 in relief aperture 40 during the assembly of inflator 30 with other components into airbag module 10.

Figure 8:
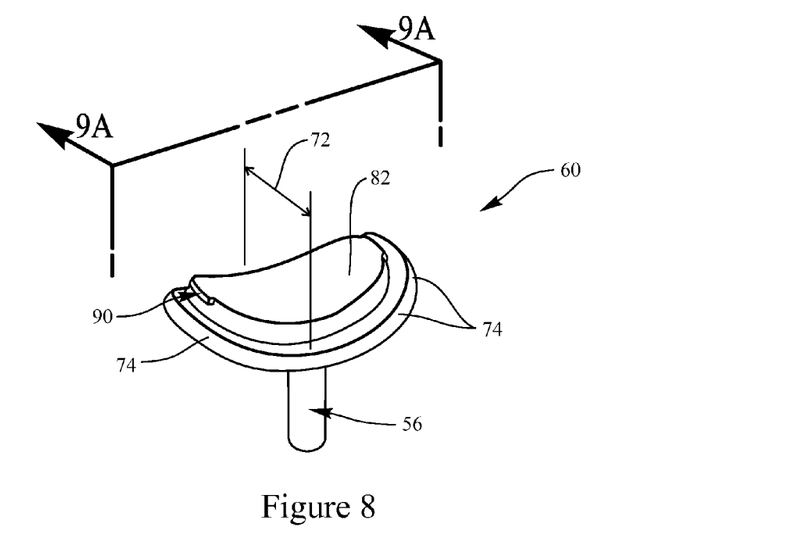
FIG. 8 is a perspective view of the closure structure in FIGS. 6 and 7.

FIG. 8 is a perspective view of closure structure 60 apart from other elements of airbag module 10. Closure core 72 is circumscribed by sealing flange 74, while retention snaps 90 project from opposed portions of the periphery of inner surface 82 of closure core 72.

Figure 9A:
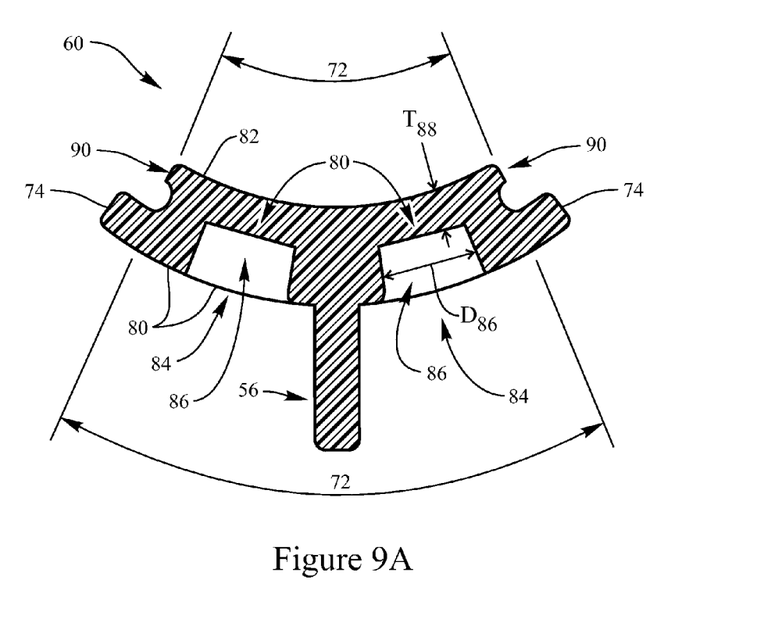
FIG. 9A is a cross section of the closure structure of FIG. 8 taken along section line 9A-9A shown therein.

FIG. 9A is a cross-sectional view of closure structure 60 of FIG. 8 taken along section line 9A-9A therein. Identical, temperature-sensitive venting windows 84 are formed in closure core 72. Each venting window 84 includes a venting passageway 86 that is sealingly traversed by a respective relatively thin venting membrane 88. One surface of each of venting membranes 88 is flush with inner surface 82 of closure core 72. As shown relative only to the venting window 84 shown on the right side of FIG. 9A, venting passageway 86 has a diameter $D_{86}$, while venting membrane 88 has a thickness $T_{88}$.

Figures 9B, 9C, 9D:
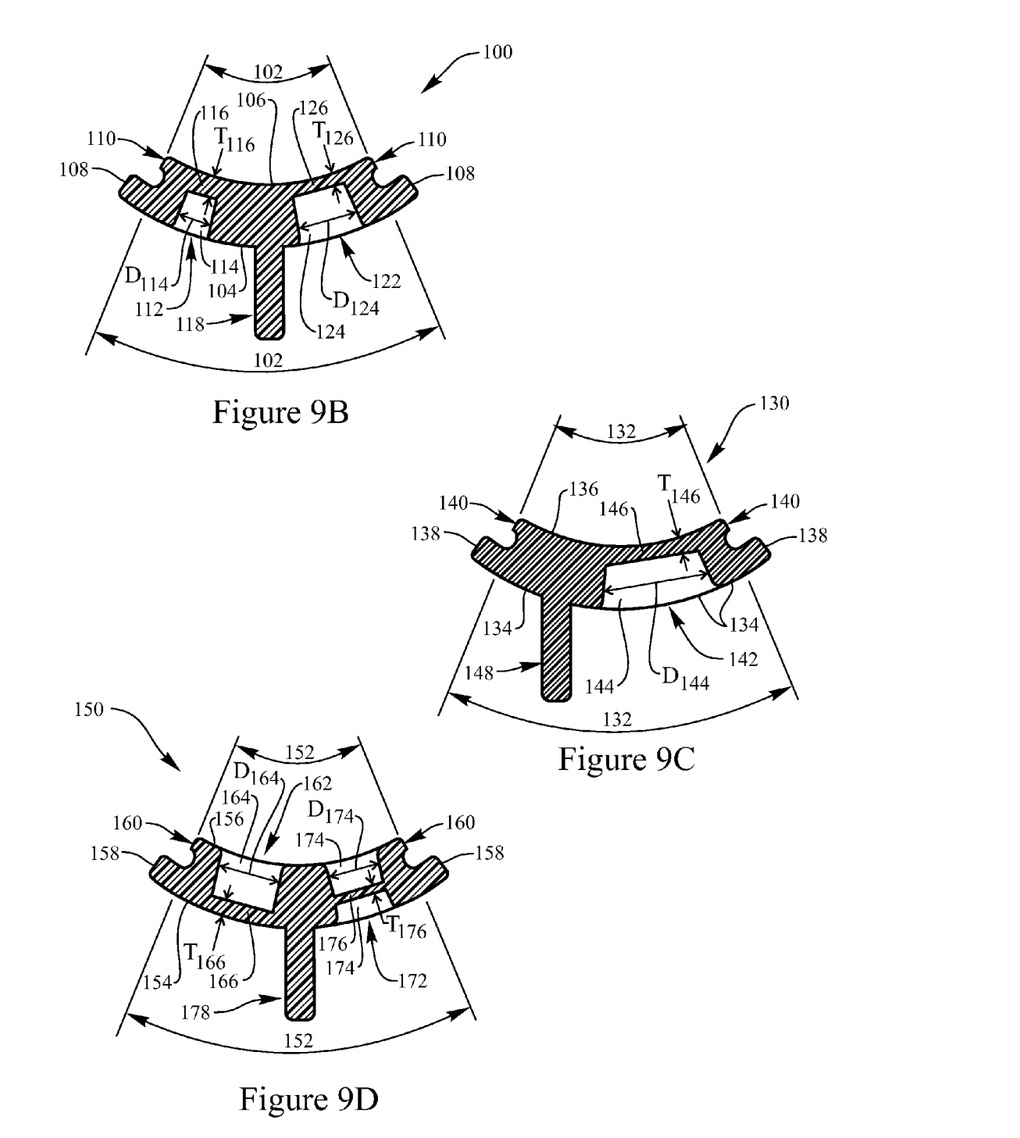
FIG. 9B is a cross section like that in FIG. 9A of a second embodiment of a closure structure incorporating teachings of the present invention.
FIG. 9C is a cross section like that in FIG. 9A of a third embodiment of a closure structure incorporating teachings of the present invention.
FIG. 9D is a cross section like that in FIG. 9A of a fourth embodiment of a closure structure incorporating teachings of the present invention.

FIG. 9B is a cross section like that of FIG. 9A, but of a second embodiment of a closure structure 100 incorporating teachings of the present invention. Closure structure 100 includes a closure core 102 capable of disposition from the exterior of an inflator in a relief aperture formed through the wall of that inflator. Closure core 102 has an outer surface 104 and an inner surface 106. A sealing flange 108 is continuously secured to the periphery of outer surface 104 of closure core 102. A pair of retention snaps 110 project outwardly from closure core 102 at respective opposite sides of inner surface 106 thereof.

A temperature-sensitive venting window 112 is formed through closure core 102, precluding the passage of pressurized inflation gas through closure core 102 during low, first ambient temperature condition $T_1$ and opening to emit pressurized inflation gas through closure core 102 during an elevated, second ambient temperature condition $T_2$ that is hotter than low, first ambient temperature condition $T_1$.

Venting window 112 includes a venting passageway 114 formed through closure core 102 between outer surface 104 and inner surface 106 thereof. A relatively thin venting membrane 116 sealingly traverses venting passageway 114. A surface of venting membrane 116 is flush with inner surface 106 of closure core 102. Venting membrane 116 precludes the passage of pressurized inflation gas through venting passageway 114 during low, first ambient temperature condition $T_1$, but venting membrane 116 ruptures to emit pressurized inflation gas through venting passageway 114 during some hotter ambient temperature condition. In venting window 112, venting passageway 114 has a diameter $D_{114}$, while venting membrane 116 has a thickness $T_{116}$.

An installation verification post 118 projects from outer surface 104 of closure core 102. On the opposite side of installation verification post 118 from venting window 112, closure structure 100 includes a supplemental venting window 122 formed through closure core 102 between outer surface 104 and inner surface 106 thereof. Supplemental venting window 122 includes a supplemental venting passageway 124 formed through closure core 102 between outer surface 104 and inner surface 106. A relatively thin supplemental venting membrane 126 sealingly traverses supplemental venting passageway 124. A surface of supplemental venting membrane 126 is flush with inner surface 106 of closure core 102. In supplemental venting window 122, supplemental venting passageway 124 of has a diameter $D_{124}$, while supplemental venting membrane 126 has a thickness $T_{126}$.

Diameter $D_{114}$ of venting passageway 114 in venting window 112 is less than diameter $D_{124}$ of supplemental venting passageway 124 in supplemental venting window 122. Alternatively, these relationships could be reversed, or diameter $D_{124}$ and diameter $D_{114}$ could be equal, without departing from teachings of the present invention.

Thickness $T_{116}$ of venting membrane 116 in venting window 112 is greater than thickness $T_{126}$ of supplemental venting membrane 126 in supplemental venting window 122. Accordingly, venting membrane 116 of venting window 112 precludes the passage of pressurized inflation gas through venting passageway 114 in venting window 112 during low, first ambient temperature condition $T_1$, as well as during hotter elevated, second ambient condition $T_2$. Because thickness $T_{116}$ is greater than thickness $T_{126}$, venting membrane 116 in venting window 112 ruptures to emit pressurized inflation gas through supplemental venting passageway 124 only during a predetermined highly-elevated, third ambient temperature condition $T_3$ that is hotter even than elevated, second ambient temperature condition $T_2$. Thus, at highly-elevated, third ambient temperature condition $T_3$, both venting membrane 116 in venting window 112 and supplemental venting membrane 126 in supplemental venting window 122 rupture and emit pressurized inflation gas through each of venting passageway 114 and supplemental venting passageway 124, respectively.

FIG. 9C is a cross section like that of FIG. 9B, but of a third embodiment of a closure structure 130 incorporating teachings of the present invention. Closure structure 130 includes a closure core 132 capable of disposition from the exterior of an inflator in a relief aperture formed through the wall of that inflator. Closure core 132 has an outer surface 134 and an inner surface 136. A sealing flange 138 is continuously secured about the periphery of outer surface 134 of closure core 132. A pair of retention snaps 140 project outwardly from closure core 132 at respective opposite sides of outer surface 136 thereof.

A single temperature-sensitive venting window 142 is formed through closure core 132 precluding the passage of pressurized inflation gas through closure core 132 during low, first ambient temperature condition $T_1$ and opening to emit pressurized inflation gas through closure core 132 during an elevated, second ambient temperature condition $T_2$ that is hotter than low, first ambient temperature condition $T_1$. Of course, it should be understood that the venting window 142 can be a pressure-sensitive venting window that opens to emit pressurized inflation gas through the closure core 132 during an elevated second ambient pressure condition that is greater than a first ambient pressure condition.

Venting window 142 includes a venting passageway 144 formed through closure core 132 between outer surface 134 and inner surface 136 thereof. A relatively thin venting membrane 146 sealingly traverses venting passageway 144. A surface of venting membrane 146 is flush with inner surface 136 of closure core 132. In the alternative, a surface of venting membrane 146 could be flush with outer surface 134 of closure core 132 without departing form the teachings of the present invention. Venting membrane 146 precludes the passage of pressurized inflation gas through venting passageway 144 during low, first ambient temperature condition $T_1$, but venting membrane 146 ruptures to emit pressurized inflation gas through venting passageway 144 during elevated, second ambient temperature condition $T_2$. Venting passageway 144 has a diameter $D_{144}$, while venting membrane 146 has a thickness $T_{146}$. An installation verification post 148 projects from outer surface 134 of closure core 132.

FIG. 9D is a cross section like that of FIG. 9C, but of a fourth embodiment of a closure structure 150 incorporating teachings of the present invention. Closure structure 150 includes a closure core 152 capable of disposition from the exterior of an inflator in a relief aperture formed through the wall of that inflator. Closure core 152 has an outer surface 154 and an inner surface 156. A sealing flange 158 is continuously secured to the periphery of outer surface 154 of closure core 152. A pair of retention snaps 160 project outwardly from closure core 152 at respective opposite sides of inner surface 156 thereof.

A temperature-sensitive venting window 162 is formed through closure core 152 precluding the passage of pressurized inflation gas through closure core 152 during low, first ambient temperature condition $T_1$ and opening to emit pressurized inflation gas through closure core 152 during an elevated, second ambient condition $T_2$ that is hotter than low, first ambient temperature condition $T_1$.

Venting window 162 includes a venting passageway 164 formed through closure core 152 between outer surface 154 and inner surface 156 thereof. A relatively thin venting membrane 166 sealingly traverses venting passageway 164. A surface of venting membrane 166 is flush with outer surface 154 of closure core 152. In the alternative, a surface of venting membrane 166 could be flush with inner surface 156 of closure core 152 without departing form the teachings of the present invention. Venting membrane 166 precludes the passage of pressurized inflation gas through venting passageway 164 during low, first ambient temperature condition $T_1$, but venting membrane 166 ruptures to emit pressurized inflation gas through venting passageway 164 during some hotter ambient temperature condition. In venting window 162, venting passageway 164 has a diameter $D_{164}$, while venting membrane 166 has a thickness $T_{166}$.

An installation verification post 178 projects from outer surface 154 of closure core 152. On the opposite side of installation verification post 178 from venting window 162, a temperature-sensitive supplemental venting window 172 is formed through closure core 152 that precludes the passage of pressurized inflation gas through closure core 152 during low, first ambient temperature condition $T_1$, and opening to emit pressurized inflation gas through closure core 152 during an elevated, second ambient temperature condition $T_2$ that is hotter than low, first ambient temperature condition $T_1$.

Supplemental venting window 172 includes a supplemental venting passageway 174 formed through closure core 152 between inner surface 156 and outer surface 154, as well as a relatively thin supplemental venting membrane 176 that traverses supplemental venting passageway 174. Neither surface of supplemental venting membrane 176 is flush with either outer surface 154 or with inner surface 156 of closure core 152. Instead, supplemental venting membrane 176 extends across supplemental venting passageway 174 at a location intermediate outer surface 154 and inner surface 156 of closure core 152. In supplemental venting window 172, supplemental venting passageway 174 has a diameter $D_{174}$, while supplemental venting membrane 176 has a thickness $T_{176}$.

Diameter $D_{164}$ of venting passageway 164 of venting window 162 is greater than diameter $D_{174}$ of supplemental venting passageway 174 of supplemental venting window 172. Alternatively, these relationships could be reversed, or diameter $D_{164}$ and diameter $D_{174}$ could be equal, without departing from teachings of the present invention.

Thickness $T_{176}$ of supplemental venting membrane 176 of supplemental venting window 172 is less than thickness $T_{166}$ of venting membrane 166 of venting window 162. Accordingly, venting membrane 166 of venting window 162 precludes the passage of pressurized inflation gas through venting passageway 164 of venting window 162 during low, first ambient temperature condition $T_1$, as well as during hotter elevated, second ambient temperature condition $T_2$. Because thickness $T_{166}$ is greater than thickness $T_{176}$, venting membrane 166 of venting window 162 ruptures to emit pressurized inflation gas through venting window 162 only during a highly-elevated, third ambient temperature condition $T_3$ that is hotter even than elevated, second ambient temperature condition $T_2$. Thus, at highly-elevated, third ambient temperature condition $T_3$, both supplemental venting membrane 176 of supplemental venting window 172 and venting membrane 166 of venting window 162 rupture to emit pressurized inflation gas through each of supplemental venting passageway 174 and venting passageway 164, respectively.

Figure 10:
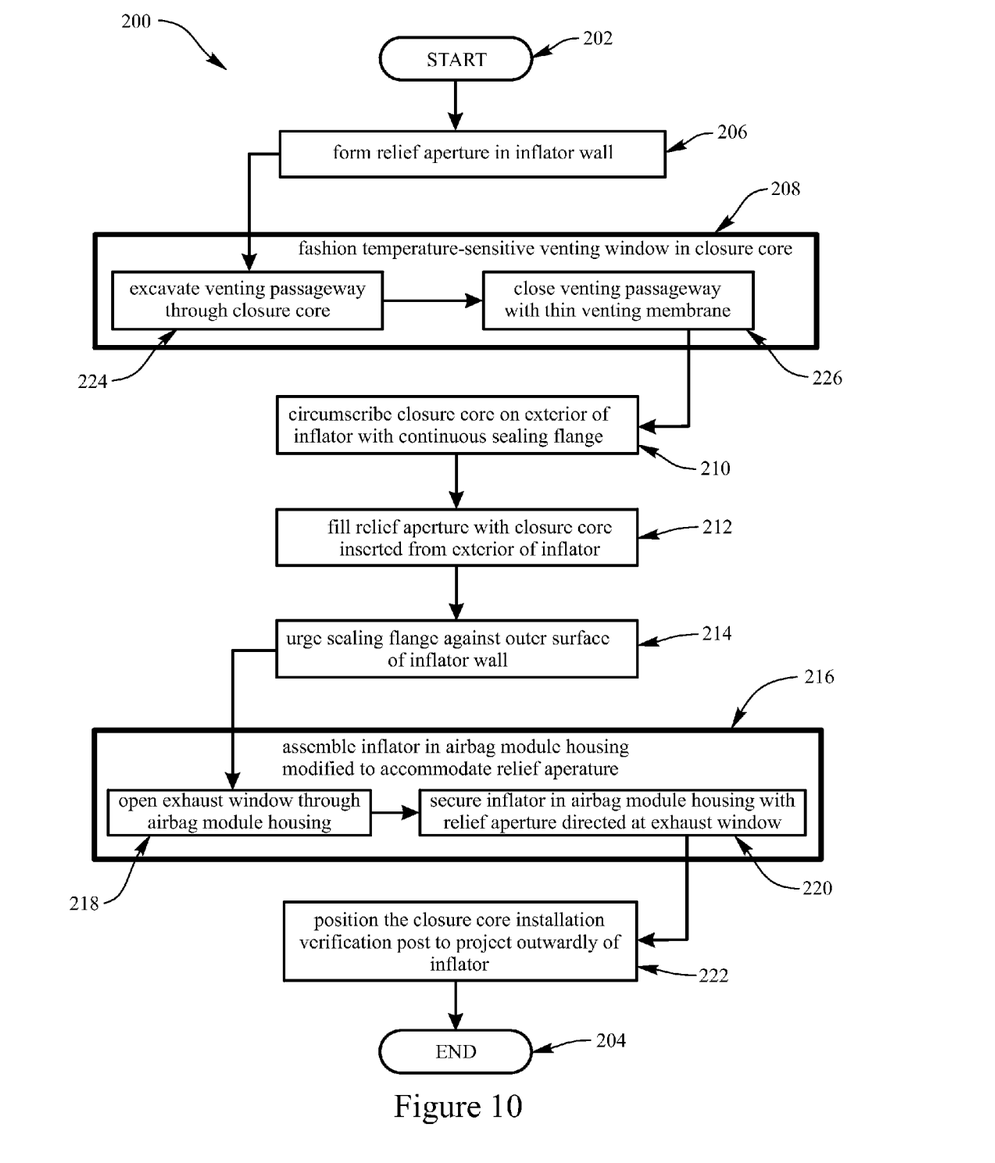
FIG. 10 is a flow chart illustrating steps in a method incorporating teachings of the present invention for inflating the cushion of a passenger vehicle safety airbag module in elevated ambient temperature conditions.

The present invention also includes methods for inflating the cushion of a vehicular passenger safety air bag module under high temperature ambient conditions FIG. 10 illustrates one embodiment of a method 200 for inflating the cushion of a passenger vehicle safety airbag module in elevated ambient temperature conditions. Typically, such an airbag module includes an inflator for the cushion that is disposed within a rigid housing in fluid communication with the interior of the cushion. The inflator is capable of supplying pressurized inflation gas to the cushion through an inflation aperture formed through the wall of the inflator. Method 200 begins at initiation oval 202 and concludes at termination oval 204.

Method 200 includes first, the step presented in instruction box 206 of forming a relief aperture in the wall of the inflator on a side of the inflator opposite from the inflation aperture. As indicated in instruction rectangle 212, the relief aperture is filled with a closure core (prepared in advance) that is inserted thereinto from the exterior of the inflator. As called for in subroutine box 208 and prior to insertion into the relief aperture, a temperature-sensitive venting window and an installation verification post are fashioned in the closure core. The venting window precludes the passage of pressurized inflation gas through the closure core during a low, first ambient temperature condition and opens to emit pressurized inflation gas through the closure core during an elevated, second ambient temperature condition that is hotter than the first ambient temperature condition. As indicated in instruction rectangle 210, the closure core is circumscribed on the exterior of the inflator with a continuous sealing flange. As the relief aperture is filled with the closure core, the sealing flange is urged against the outer surface of the wall of the inflator in a step called for in instruction rectangle 214.

As indicated in subroutine box 216, the inflator is assembled in an airbag module housing modified to accommodate the relief aperture created in the wall of the inflator in instruction rectangle 206. The subroutine of assembling is accomplished first by opening an exhaust window through the housing of the airbag module, as indicated in instruction rectangle 218. Then as called for in instruction rectangle 220, the inflator is secured in the airbag module housing with the relief aperture in the wall of the inflator directed at an exhaust window in the housing of the airbag module. Method 200 includes the step called for in instruction rectangle 222 of attaching to the closure core an installation verification post that projects outwardly of the inflator, when the relief aperture is filled with the closure core.

The fashioning of a temperature-sensitive venting window in the closure core called for in subroutine box 208 includes the step suggested in instruction rectangle 224 of excavating a venting passageway through the closure core between an outer surface thereof that is oriented toward the exterior of the inflator and the inner surface thereof that is oriented toward the interior of the inflator. The venting passageway is closed with a relatively thin venting membrane, as indicated in instruction rectangle 226 either by leaving the passageway closed or by blocking the passageway with the venting membrane. The venting membrane is comprised of a temperature-sensitive material capable of precluding the passage of pressurized inflation gas through the venting passageway during the low, first ambient temperature condition and rupturing to emit pressurized inflation gas through the venting passageway during the elevated, second ambient temperature condition.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A closure structure for a relief aperture in the wall of an inflator of a passenger vehicle safety airbag module, the closure comprising:
   a closure core having a sealing flange for disposition in and substantially filling the relief aperture from the exterior of the inflator, the sealing flange abutting the outer surface of the wall of the inflator upon disposition of the closure core in the relief aperture; and
   a venting window formed in the closure core precluding passage of pressurized inflation gas through the closure core during a predetermined first ambient condition and opening to emit pressurized inflation gas through the closure core during a predetermined second ambient condition elevated above the first ambient condition.

2. A closure structure as recited in claim 1, wherein the venting window is a temperature-sensitive venting window and the second ambient condition is at a temperature hotter than the first ambient condition.

3. A closure structure as recited in claim 1, wherein the venting window is a pressure-sensitive venting window and the second ambient condition is at a pressure greater than the first ambient condition.

4. A closure structure as recited in claim 1, further comprising a retention snap extending radially outwardly from the periphery of the closure core, the retention snap engaging the inner surface of the wall of the inflator upon disposition of the closure core in the relief aperture.

5. A closure structure as recited in claim 1, wherein the closure core has an inner surface and an outer surface and the venting window comprises:
   a venting passageway formed through the closure core between the inner surface and the outer surface thereof; and
   a relatively thin venting membrane sealingly traversing the venting passageway, the venting membrane precluding passage of pressurized inflation gas through the venting passageway during the first ambient condition, and the venting membrane rupturing to emit pressurized inflation gas through the venting passageway during the second ambient condition.

6. A closure structure as recited in claim 5, wherein the venting membrane traverses the venting passageway intermediate the inner surface and the outer surface of the closure core.

7. A closure structure as recited in claim 5, wherein the venting membrane is comprised of a temperature-sensitive material exhibiting less structural robustness at the second ambient condition than at the first ambient condition.

8. A closure structure as recited in claim 7, wherein the temperature-sensitive material is selected from the group of temperature-sensitive materials comprising nylon, acrylonitrile-butadiene-styrene, and polypropylene.

9. A closure structure as recited in claim 5, further comprising a temperature-sensitive supplemental venting window formed in the closure core, the supplemental venting window comprising:
   a supplemental venting passageway formed through the closure core between the inner surface and the outer surface thereof; and
   a relatively thin supplemental venting membrane sealingly traversing the supplemental venting passageway, the supplemental venting membrane precluding passage of pressurized inflation gas through the venting passageway during the first ambient condition and during the second ambient condition, and the supplemental venting membrane rupturing to emit pressurized inflation gas through the venting passageway during a predetermined third ambient condition hotter than the second ambient condition.

10. A closure structure as recited in claim 9, wherein the thickness of the supplemental venting membrane is greater than the thickness of the venting membrane.

11. A closure structure as recited in claim 1, further comprising an installation verification post projecting from an outer surface of the closure core.

12. A closure structure as recited in claim 11, wherein the closure core, the sealing flange, the venting window, and the installation verification post are integrally formed from a temperature-sensitive material exhibiting less structural robustness at the second ambient condition hotter than at the first ambient condition.

13. A passenger vehicle safety airbag module having a housing securable within a passenger vehicle and an inflatable cushion secured in a deflated condition within the housing, the module comprising:
   an inflator disposed in the housing in fluid communication with the interior of the cushion, the inflator being capable of supplying pressurized inflation gas to the cushion through an inflation aperture formed through the wall of inflator, and the inflator having a relief aperture formed through the wall thereof on a side of the inflator generally opposite from the inflation aperture;
   a temperature-sensitive closure structure disposed in the relief aperture, the closure structure comprising:
      a closure core having a sealing flange disposed within and substantially filling the relief aperture, the sealing flange disposed about the periphery of the closure core and in abutment with the outer surface of the wall of the inflator; and
      a temperature-sensitive venting window formed in the closure core precluding passage of pressurized inflation gas through the closure core during a predetermined first ambient temperature condition and opening to emit pressurized inflation gas through the closure core during a predetermined second ambient temperature condition hotter than the first ambient temperature condition; and
   a clamp securing the inflator against the interior of the housing with the sealing flange of the closure structure compressed therebetween.

14. A passenger vehicle safety airbag module as recited in claim 13, wherein the relief aperture in the wall of the inflator is directed toward the housing, and an exhaust window is formed through the housing generally aligning with the relief aperture.

15. A passenger vehicle safety airbag module as recited in claim 13, wherein the inflator is disposed within the cushion, and the inflator secures the cushion to the housing.

16. A passenger vehicle safety airbag module as recited in claim 14, wherein the closure structure has an inner surface and an outer surface and further comprises:
   an installation verification post projecting from the outer surface of the closure core and through the exhaust window in the housing; and
   a retention snap extending radially outwardly from the periphery of the inner surface of the closure core and engaging the inner surface of the wall of the inflator.

17. A method for inflating the cushion of a passenger vehicle safety airbag module in elevated ambient temperature conditions, the module including an inflator for the cushion disposed within a housing in fluid communication with the interior of the cushion, the inflator being capable of supplying pressurized inflation gas to the cushion through an inflation aperture formed through the wall of the inflator, the method comprising the steps of:
   forming a relief aperture in the wall of the inflator on a side thereof opposite from the inflation aperture;
   fashioning a temperature-sensitive venting window in the closure core, the venting window precluding the passage of pressurized inflation gas through the closure core during a predetermined first ambient temperature condition and opening to emit pressurized inflation gas through the closure core during a predetermined second ambient temperature condition hotter that the first ambient temperature condition;
   circumscribing the closure core on the exterior of the inflator with a continuous sealing flange; and
   filling the relief aperture with a closure core inserted into the relief aperture from the exterior of the inflator.

18. A method as recited in claim 17, further comprising the step of urging the sealing flange against the outer surface of the wall of the inflator.

19. A method as recited in claim 17, further comprising the steps of:
   opening an exhaust window through the housing of the airbag module; and
   securing the inflator within the housing with the relief aperture in the wall of the inflator directed toward the exhaust window.

20. A method as recited in claim 17, wherein the step of fashioning a temperature-sensitive venting window in the closure core comprises the steps of:
   excavating a venting passageway through the closure core; and
   closing the venting passageway with a relatively thin venting membrane, the venting membrane being comprised of a temperature-sensitive material capable of precluding passage of pressurized inflation gas through the venting passageway during the first ambient temperature condition and rupturing to emit pressurized inflation gas through the venting passageway during the second ambient temperature condition.

21. A method as recited in claim 20, wherein the temperature-sensitive material of the venting membrane exhibits less structural robustness at the second ambient temperature condition than at the first ambient temperature condition.

22. A method as recited in claim 17, further comprising the step of attaching to the closure core an installation verification post, the installation verification post projecting outwardly of the inflator when the relief aperture is filled with the closure core.

* * * * *